(12) United States Patent
Clausen et al.

(10) Patent No.: US 9,014,244 B2
(45) Date of Patent: Apr. 21, 2015

(54) METHODS OF IMPLEMENTING LOW-POWER MODE FOR DSL MODEMS

(75) Inventors: Axel Clausen, Munich (DE); Umashankar Thyagarajan, Bangalore (IN); Thomas Zettler, Hoehenkirchen-Siegertsbrunn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 323 days.

(21) Appl. No.: 12/748,489

(22) Filed: Mar. 29, 2010

(65) Prior Publication Data

US 2010/0254444 A1 Oct. 7, 2010

Related U.S. Application Data

(60) Provisional application No. 61/166,458, filed on Apr. 3, 2009.

(51) Int. Cl.
| | |
|---|---|
| *H04B 1/38* | (2006.01) |
| *H04M 11/06* | (2006.01) |
| *H04L 5/00* | (2006.01) |
| *H04L 5/14* | (2006.01) |
| *H04W 52/42* | (2009.01) |

(52) U.S. Cl.
CPC ........... *H04M 11/062* (2013.01); *H04L 5/0042* (2013.01); *H04L 5/1438* (2013.01); *H04W 52/42* (2013.01)

(58) Field of Classification Search
CPC ....................................................... H04B 1/38
USPC .................................................. 375/222, 260
See application file for complete search history.

(56) References Cited

U.S. PATENT DOCUMENTS

| | | | |
|---|---|---|---|
| 7,403,569 B2 * | 7/2008 | Redfern | 375/260 |
| 7,411,998 B1 * | 8/2008 | Cole | 375/222 |
| 2002/0193134 A1 * | 12/2002 | Kim | 455/522 |
| 2005/0157804 A1 * | 7/2005 | Jones | 375/261 |
| 2005/0169392 A1 * | 8/2005 | Redfern | 375/260 |
| 2005/0254515 A1 * | 11/2005 | Suzuki et al. | 370/463 |
| 2009/0022214 A1 * | 1/2009 | Locke | 375/222 |

FOREIGN PATENT DOCUMENTS

| | | |
|---|---|---|
| EP | 2043350 A1 | 4/2009 |
| WO | 2006081922 A1 | 8/2006 |

OTHER PUBLICATIONS

Redfern, Arthur, Texas Instruments et al., "An Efficient L2 Mode for VDSL2; D 1067", ITU-T Draft Study Period 2001-2004, International Telecommunication Union, Geneva; CH, vol. Study Group 15, Apr. 19, 2004.
European Search Report mailed Jul. 7, 2010 in re Application No. 100003244.0-2414.

* cited by examiner

*Primary Examiner* — Jaison Joseph

(57) ABSTRACT

According to an embodiment, a DSL transceiver is set in a low power mode and moved out of the low power mode responsive to the DSL transceiver receiving data. Data is transmitted only on a first group of sub-carriers when moving the DSL transceiver out of the low power mode, the first group of sub-carriers being a subset of the sub-carriers available to the DSL transceiver for transmission.

20 Claims, 4 Drawing Sheets

METHODS OF IMPLEMENTING LOW-POWER MODE FOR DSL MODEMS

CROSS REFERENCE TO RELATED APPLICATIONS

This application claims the benefit of U.S. Provisional Application No. 61/166,458, filed 3 Apr. 2009, which is incorporated herein by reference in its entirety.

BACKGROUND

Multi-carrier transmission systems which provide high speed data communication over a local subscriber loop connecting a customer to a central office are commonly referred to as "xDSL" systems, where "x" specifies a particular variant of DSL (digital subscriber line). The term xDSL refers to DSL technologies such as ADSL (asymmetric DSL), HDSL (high bit rate DSL), IDSL (ISDN DSL), SDSL (symmetric DSL), VDSL (very high speed DSL), etc. These and other types of xDSL systems are generically referred to herein as "DSL" systems.

In a DSL system, each customer has a modem for communicating with a digital subscriber line access multiplexer (DSLAM) at the central office of the service provider. The DSLAM terminates and aggregates the DSL circuits, handing them off onto other networking transports. Each communication channel between a customer and the central office is terminated by a pair of transceivers which communicate with each other. The total bandwidth of the channel interconnecting the customer and the central office is typically divided into several different sub-carriers. Each sub-carrier is centered at a particular frequency and has a particular bandwidth. One group of the sub-carriers is allocated for transmissions from the central office to the customer modem, i.e. the downstream direction. A second group of the sub-carriers is allocated for transmissions from the customer modem to the central office, i.e. the upstream direction. Additional sub-carriers can be allocated for overhead and control functions.

Data to be communicated between a customer modem and the central office is split into groups of bits, one group of bits per sub-carrier. Each group of bits is modulated onto a carrier, e.g. using quadrature amplitude modulation (QAM) and mapped into a vector defined by a point on the modulation "constellation." The constellation specifies the allowable data points for transmission. Each point on the constellation is typically referred to as a symbol. The number of bits which is modulated on each subcarrier is referred to as the bit loading for this subcarrier. A symbol can represent more bits when a higher-order modulation scheme is used or fewer bits when a lower-order modulation scheme is used. During a symbol transmission time period, a symbol is transmitted on each sub-carrier in parallel with the other sub-carriers so that large amounts of data can be transmitted during each symbol period.

Conventional DSL equipment provides almost constant data rate for the duration of the link independent of the bandwidth required by the customer. However, most customers require high bandwidth only for a few hours per day. During the remainder of the time, the customer applications may require only a fraction of the usable bandwidth or possibly even no bandwidth at all. For example, voice applications such as VoIP typically require a bandwidth of 128 kbps. Yet, customers who have signed up only for a voice service have DSL equipment running for 24 hours a day without ever using the provided data rate which can range from 256 kbps to 3 Mbps or even higher depending on the type of DSL service. Maintaining a constant data rate during periods of low or no bandwidth demand unnecessarily wastes power. In addition, existing DSL lines expanded for triple play services (high-speed Internet, TV and voice) are usually always powered on. The result is an enormous demand of energy for telecommunication equipment, making telecommunication service providers some of the single largest energy consumers in the world.

The ADSL2 standard defines a low power mode (L2 mode). The L2 mode allows modems to reduce the bitloading and/or reduce the transmit power when no data or only a small amount of data is to be transmitted. In practice, the ADSL2 L2 mode is not widely used. A significant amount of fluctuating crosstalk can occur in a cable binder (i.e., bundle) when modems move back and forth between the L2 mode and regular full data transmission. This fluctuating crosstalk must be accounted for by all modems coupled to the same cable binder. Otherwise, data errors can occur. The concept of virtual noise has been introduced to control the non-stationary crosstalk caused by entering and exiting the ADSL2 L2 mode. With virtual noise, modems can be made aware of the DSL lines that are not active but which can potentially be activated. The modems can use this information to employ frequency-specific margins for providing protection against non-stationary crosstalk. However, conventional virtual noise techniques cause a significant loss of data rate when applied over the complete transmission band. In addition, the ADSL2 L2 mode does not allow for fully powering down the sub-carriers, limiting the power saving potential of the ADSL2 L2 mode. Furthermore, the ADSL2 L2 mode is only defined for downstream transmissions. As such, no power reduction can be realized at the customer side.

SUMMARY

According an embodiment, a DSL transceiver is set in a low power mode and moved out of the low power mode responsive to the DSL transceiver receiving data. Data is transmitted only on a first group of sub-carriers when moving the DSL transceiver out of the low power mode, the first group of sub-carriers being a subset of the sub-carriers available to the DSL transceiver for transmission.

According to another embodiment, a DSL transceiver is set in a low power mode and subsequently exits from the low power mode. Data is transmitted on a first group of sub-carriers during the exit from the low power mode. A transmit power of sub-carriers not belonging to the first group of sub-carriers is also gradually increased during the exit from the low power mode.

According to yet another embodiment, power consumption by a first transceiver is controlled by establishing a communication channel with a second transceiver over a plurality of sub-carriers using a modulation scheme agreed to by the transceivers and deactivating at least some of the sub-carriers responsive to the first transceiver entering a low power state. The communication channel is reestablished over a subset of the sub-carriers using a predetermined modulation scheme generally immune to crosstalk responsive to the first transceiver exiting the low power state. The remainder of the sub-carriers are reactivated when more communication bandwidth is required than can be provided by the subset of sub-carriers used to reestablish the communication channel.

According to still another embodiment, power consumption by a DSL transceiver is controlled by supporting low bandwidth operations at the DSL transceiver using a first group of sub-carriers allocated to the DSL transceiver while a second group of sub-carriers allocated to the DSL transceiver is powered-down. The second group of sub-carriers is re-powered so that higher bandwidth operations are supported at the DSL transceiver using both the first and second groups of sub-carriers.

Those skilled in the art will recognize additional features and advantages upon reading the following detailed description, and upon viewing the accompanying drawings.

DETAILED DESCRIPTION

Figure 1:
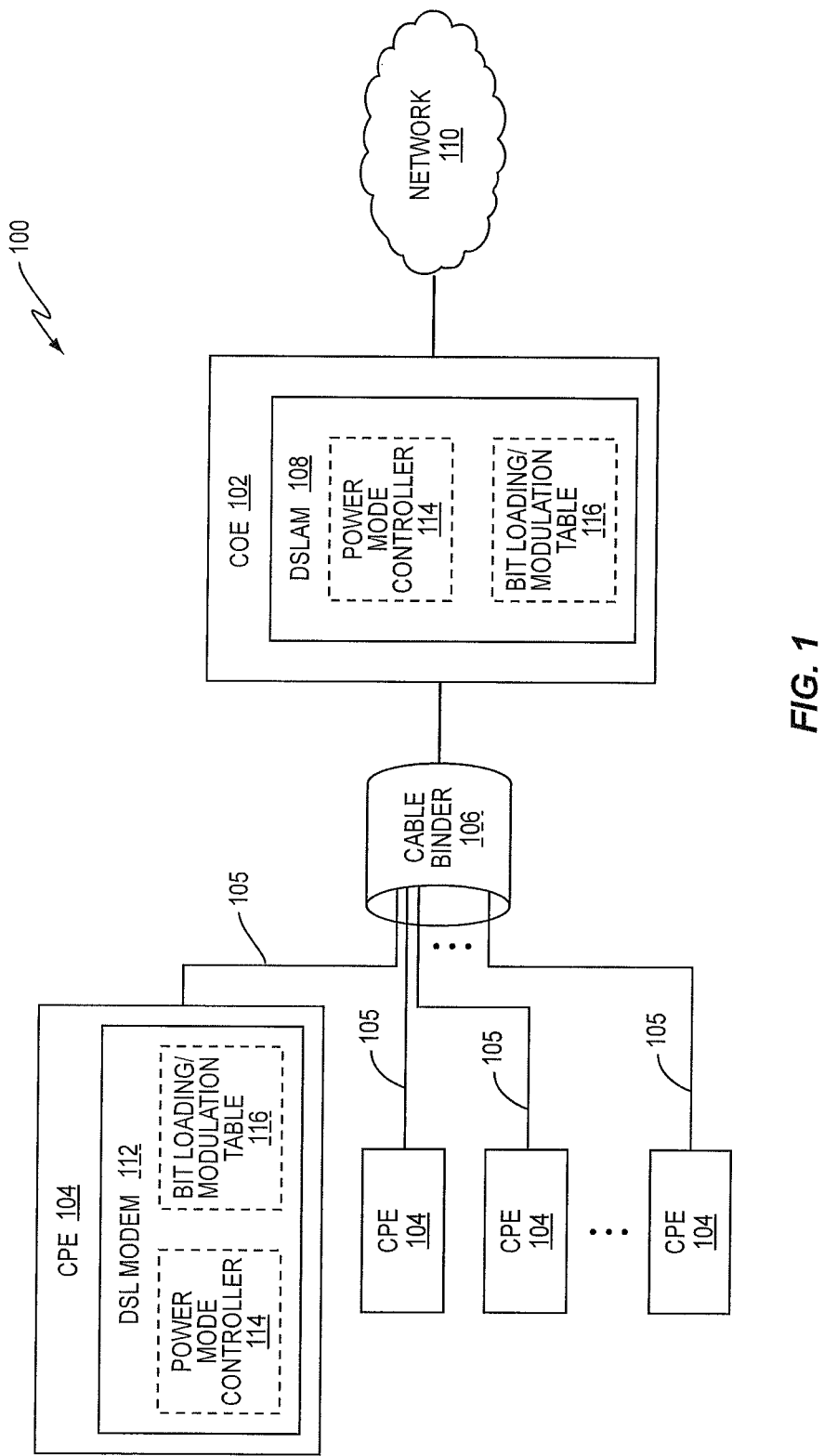
FIG. 1 illustrates a block diagram of an embodiment of a DSL system including central office equipment coupled to a plurality of DSL modems via a cable binder.

FIG. 1 illustrates an embodiment of a DSL system 100 including central office equipment 102 (COE) connected to customer premise equipment 104 (CPE) over different communication channels. Each channel is physically implemented over a line 105 bundled with other lines in a cable binder 106. Each line 105 may include a twisted wire pair, a fiber optic cable or any other suitable medium for carrying DSL-based signals. The COE 102 includes a DSL Access Multiplexer 108 (DSLAM) for aggregating connections from many CPEs 104 onto a single, high-capacity connection coupled to a network 110 such as an IP or ATM network. Each CPE 104 includes a DSL modem 112 for enabling communication with the COE 102 over the corresponding channel using any suitable DSL technology. Both the COE DSLAM 108 and each CPE modem 112 include a power mode controller 114. The power mode controllers 114 cooperate with one another to implement a multi-tiered power management scheme at the CPEs 104 and the COE 102.

The multi-tiered power management scheme implemented by the power mode controllers 114 enables each CPE 104 and/or the COE 102 to power down at least a portion of the resources used to support DSL communication when high bandwidth is not in demand. For example, portions of the CPE modem 112 and the COE DSLAM 108 can be powered down when the channel between a particular one of the CPEs 102 and the COE 104 is inactive or when only a narrowband service such as Voice-over-IP (VoIP) is supported over the corresponding channel. Under these conditions, the full bandwidth of the channel is not needed and thus certain CPE and/or COE resources can be powered down to save energy. In one embodiment, when additional bandwidth is subsequently needed, the power mode controllers 114 begin gradually re-powering the resources in a controlled manner so that other modems coupled to the same cable binder 106 are not adversely affected by the increased crosstalk caused by re-powering the resources. The re-powering process can be done in multiple steps so that only the COE and/or CPE resources needed to support a particular bandwidth are adequately powered. The remaining resources can be powered-down to save energy since these resources are not needed to meet the current bandwidth demand. The multi-tiered power management embodiments described herein can be implemented in the downstream (COE-to-CPE) and/or upstream (CPE-to-COE) directions. Accordingly, energy consumption can be reduced as a function of bandwidth demand at the COE 102 and/or the CPEs 104.

Figure 2:
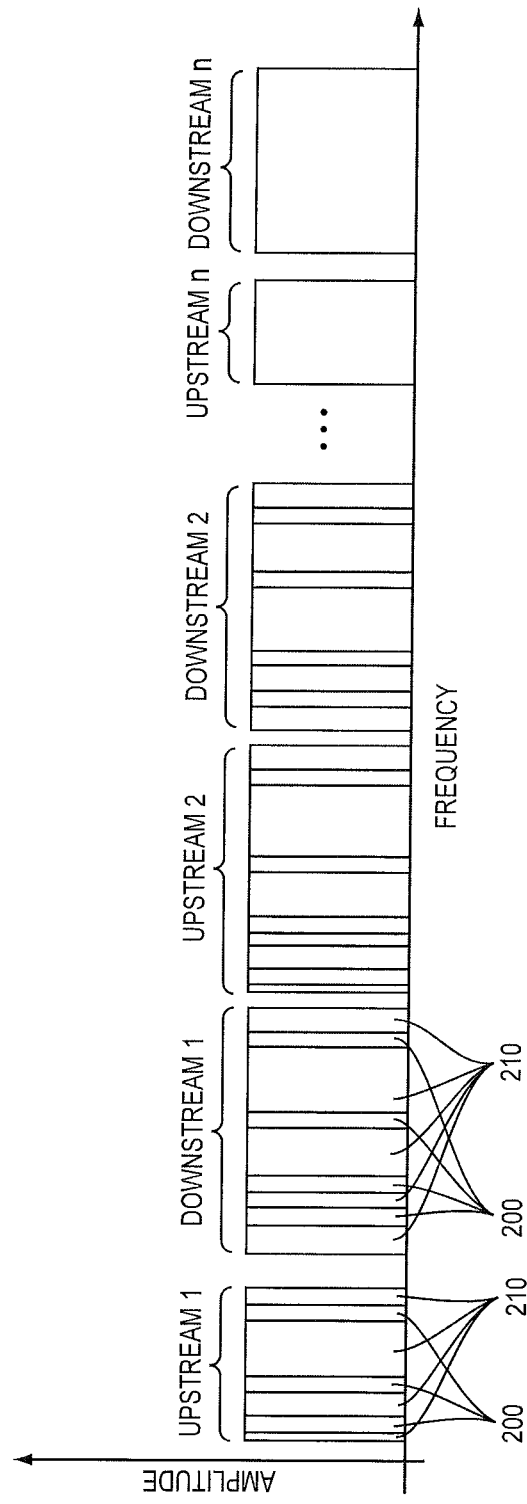
FIG. 2 illustrates an embodiment of a DSL frequency spectrum having a group of frequency sub-carriers for low power operation.

FIG. 2 illustrates an embodiment of a DSL frequency spectrum allocated for use by the CPEs 104 coupled to the COE 102 via the same cable binder 106. Each CPE 104 is allocated a plurality of sub-carriers for upstream communication and a plurality of sub-carriers for downstream communication. The power mode controller 114 in a particular CPE 104 or the power mode controller in the COE 102 partitions the frequency spectrum allocated to that CPE 104 in the upstream and/or downstream directions into a first group having a plurality of sub-carriers 200 and at least a second group also having a plurality of sub-carriers 210. Each sub-carrier 200, 210 has a certain bandwidth and is centered at a particular frequency. Data can be transmitted over the different sub-carriers 200, 210 in parallel. Some of the sub-carriers 200, 210 in each group carry information in the upstream direction and other sub-carriers 200, 210 carry information in the downstream direction. The first 116 of sub-carriers 200 is designated as a relatively low bandwidth "fast wake-up" group meaning that the sub-carriers 200 in this group can be used to quickly reestablish the communication channel between the CPE 104 and the COE 102 in either the upstream or downstream direction after a low power event subsides. The fast-wake-up group of sub-carriers 200 may be in one embodiment a band (i.e., a fast-wake-up band) including sub-carriers with successive carrier indexes. The fast-wake-up group may have in one embodiment a relatively low bandwidth between 100 Kbps to 1 Mbps. The term "low power event" as used herein means any event where the full bandwidth of a particular communication channel is not needed to reliably support an application implemented between the corresponding CPE 104 and the COE 102. A low power event can occur when there is no activity between the COE 102 and a CPE 104, e.g. after a voice call ends, after a data transaction completes, etc.

Any of the power mode controllers 114 can detect the occurrence of a low power event. As such, the multi-tiered power management scheme can be initiated by either the CPE modem 112 or the COE DSLAM 108. In either case, the power supplied to the sub-carriers 210 included in the group (s) other than the "fast wake-up" group is reduced in both the upstream and downstream directions during the low power event. This can involve lowering the power supplied to the corresponding CPE and/or COE resources or completely deactivating the sub-carriers 210 by shutting of the power supplied to the corresponding resources. The sub-carriers 200 included in the "fast wake-up" group can also be powered down if desired as explained in more detail later herein (Step 204). Powering down some or all of the sub-carriers 200, 210 during a low power event substantially reduces power consumption when there is no demand for high bandwidth services.

In one embodiment, a new VoIP call or data transaction may be initiated at either the COE 102 or one of the CPEs 104. In response, one or both of the power mode controllers 114 determine whether the sub-carriers 200 included in the "fast wake-up" group can provide sufficient communication bandwidth after the low power event subsides. The "fast wake-up" group is well-suited for narrowband applications since the group has a relatively low bandwidth. For example, if a new VoIP application is initiated, the "fast wake-up" group can provide sufficient communication bandwidth. As such, the sub-carriers 200 included in the "fast wake-up" group are powered-up if previously powered-down and the other sub-carriers 210 remain powered down to continue saving energy.

Power is gradually increased to at least some of the other band(s) 210 when the power mode controller 114 determines that the "fast wake-up" group cannot provide sufficient communication bandwidth after the low power event subsides. For example, more bandwidth may be needed when a higher bandwidth application such as web-surfing or Internet TV is launched. Each of the powered-up sub-carriers is then used to enable communication between the CPE 104 and the COE 102 so that the new application can be adequately and reliably serviced. This includes only the "fast wake-up" group 200 for low bandwidth applications and one or more additional sub-carrier group(s) for higher bandwidth applications.

The corresponding channel can be divided into several groups of sub-carriers. One group is designated the "fast wake-up" group as described above. Each additional group is powered-up and down as needed to support different bandwidth demands. For example, the "fast wake-up" group can be used to service low bandwidth applications such as VoIP. An additional group of sub-carriers can be powered-up to support higher bandwidth applications such as voice with pictures. Still another group of sub-carriers can be powered-up to support even higher bandwidth applications such as web-surfing. Yet another group of sub-carriers can be powered-up to support the highest bandwidth applications such as HDTV (high definition TV). The power mode controllers 114 gradually increase the power provided to additional sub-carriers as bandwidth demands increase so that the crosstalk injected into bundled lines included in the same cable binder changes slowly, enabling equipment coupled to these lines sufficient time to adjust to the slowly changing crosstalk. This way, services on bundled lines are not adversely affected by fluctuating crosstalk resulting from the multi-tiered power management embodiments described herein.

The multi-tiered power management scheme implemented by the power mode controllers 114 provides fast wake-up for voice services. This ensures low-delay and high quality for voice services, even upon exiting a low power state. In one embodiment, voice services can be quickly supported by the COE 102 and the CPEs 104 in less than 1 second upon exiting a low power state. Such a rapid response time is possible by protecting the "fast wake-up" group of all active lines in the binder 106 with virtual noise. In one embodiment, applying virtual noise to the "fast wake-up" group of all active lines results in a robust modulation or bit-loading scheme being used for the sub-carriers 200 included in the "fast wake-up" group. Doing so provides sufficient robustness against fluctuating crosstalk if any other lines of the binder 106 exits the low power mode. In one embodiment, data transmitted over the sub-carriers 200 of the "fast wake-up" group of the modem 112 exiting the low power mode are modulated using QPSK (quadrature phase-shift keying). This way, the COE 102 and the corresponding CPE 104 need not expend time determining a suitable modulation/bit-loading scheme after exiting a low-power state. Instead, a robust modulation/bit-loading scheme is ready for use without having to observe channel conditions, etc. This enables the COE DSLAM 108 and the corresponding CPE modem 112 to quickly reestablish the communication channel using the "fast wake-up" group of sub-carriers 200 upon exiting a low power state. In addition, the multi-tiered power management scheme implemented by the power mode controllers 114 is compatible with any DMT-based (discrete multi-tone) DSL technologies such as ADSL2, ADSL2+, VDSL2, etc. in both the upstream and downstream directions where DMT is a form of multi carrier modulation and as applied to ADSL, the frequency spectrum is made up of between 0 Hz and 1,104 MHz divided into 256 distinct sub-carriers separated by 4.3125 MHz.

Figure 3:
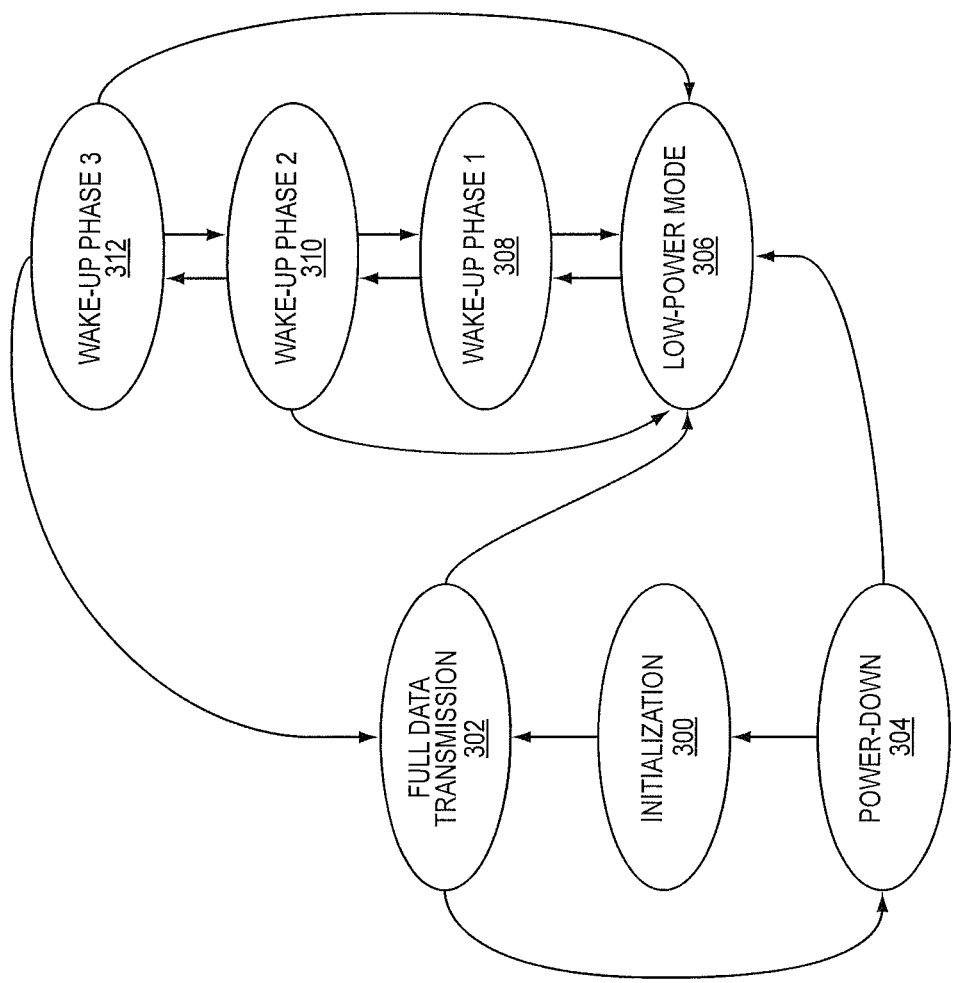
FIG. 3 illustrates an embodiment of a state transition diagram for DSL equipment configured to implement a multi-tiered power management scheme.

FIG. 3 illustrates an embodiment of a state diagram corresponding to the operation of the CPE modem 112, the COE DSLAM 108 and the power mode controllers 114. The state diagram includes several conventional operational states such as initialization (300), full data transmission (302) and power down (304) in which the CPE modem 112 and the COE DSLAM 108 can operate. These states are well understood to one of average skill in the DSL communication arts, and thus no further description is provided. FIG. 3 also illustrates additional states associated with the multi-tiered power management scheme implemented by the CPE modem 112 and the COE DSLAM 108. These states are described next with reference to the power mode controller 114 of the uppermost CPE modem 112 shown in FIG. 1 for ease of explanation only. However, the power mode controller 114 included in the COE DSLAM 108 and the other CPEs 104 can also support the same states. Thus, FIG. 3 represents the operational states of both each CPE modem 112 and the COE DSLAM 108.

If the CPE modem 112 is not transmitting any payload data, the power mode controller 114 detects the low-power event and moves the modem 112 into the low power mode (306). In this mode, the power mode controller 114 can either reduce the transmit power or completely stop the transmission by deactivating most of the sub-carriers allocated to the modem 112 and the corresponding modem resources. According to this embodiment, the modem 112 maintains a pilot carrier and/or a few additional signaling carriers with the COE 102, e.g. over some of the sub-carriers 200 included in the "fast wake-up" group. When the low-power event subsides, the modem 112 quickly begins a transmission using the "fast wake-up" group of sub-carriers 200. This transitions the modem 112 to the first wake-up phase (308). Initially, the modem 112 can use a robust modulation scheme such as QPSK in the "fast wake-up" group. The training for the "fast wake-up" group can be achieved with a very short training sequence, e.g. less than 1000 DMT symbols. Accordingly, if the modem 112 is in the power down mode (304) and is only observing the fast wake-up group of sub-carriers 200, data transmission can either start directly by using a default transmission parameter (e.g., a default bitloading or modulation scheme) or a very short training is needed when a signal is detected in the "fast wake-up" group. The new channel can be used for low bandwidth applications such as a voice call. If such a low bandwidth application needs to be transmitted, then no additional training is required and the modem 112 can go back into the low power mode (306) at the end of the application. When higher bandwidth is required, e.g. additional services/applications require more bandwidth, the modem 112 initiates a second wake-up phase (310).

In the second wake-up phase (310), the bit-loading for the "fast wake-up" group of sub-carriers 200 is increased to a higher value and/or the order of the modulation is increased to accommodate a higher bandwidth. The new bit-loading value and/or modulation scheme preferably takes into account the virtual noise definition specified for the "fast wake-up" group so that the CPE 104 moving out of the low power state is not adversely affected at a later point in time by any other modem 112 exiting the low power mode in the same binder 106. The new bit-loading value and/or modulation scheme can be obtained from a stored table 116 which was used in previous connections or can be based on an SNR (signal-to-noise) measurement performed on the robust modulation channel. According to this embodiment, the SNR is measured on the sub-carriers belonging to the "fast wake-up" group of sub-carriers and a bitloading is determined based on the SNR measurement. The modem 112 and the COE DSLAM 108 exchange the new bit loading value and/or modulation scheme so that the bandwidth of the corresponding communication channel can be increased. One or more additional properties associated with the data transmission can also be exchanged between the modem 112 and the COE DSLAM 108.

In a third phase (312), the modem 112 communicates a request to the COE DSLAM 108 for using the remaining group(s) of sub-carriers 210. The request is made by messaging over the trained "fast wake-up" group. Following approval of the request, the power mode controller 114 gradually increases the transmit power in the remaining group(s) of sub-carriers 210 and begins retraining the modem 112 accordingly. The increase in transmit power is slow enough to allow other modems coupled to the same binder 106 to take the effect of increased crosstalk into account, e.g. by adjusting their bit-loading and/or modulation using online reconfiguration techniques such as seamless rate adaptation or bit-swapping. Gradually increasing the sub-carrier transmit power in this way ensures that other lines in the same binder 106 are not adversely disturbed by the fluctuating crosstalk generated from the line which is exiting the low power mode (306). In some embodiments, the second and third phases (310, 312) could be performed at the same point in time to reduce the wake-up time. In addition, the third phase (312) can be further divided into multiple steps to make an even smoother transition to full power mode (302). Other state transitions are also possible. In one embodiment, the CPE modem 112 and/or COE DSLAM 108 can move from the full data transmission phase (302) directly to either the first wake-up phase (308) or to the second wake-up phase (310), e.g. when the bandwidth demand of the current application(s) falls below a certain threshold. In another embodiment, the CPE modem 112 and/or COE DSLAM 108 can move from the power-down mode (304) directly to the low-power mode (306) by observing only the fast wake-up group of sub-carriers 200 when in the power-down mode (304) as previously described herein.

The "fast wake-up" group implemented by each CPE modem 112 and/or the COE DSLAM 108 is located in a frequency band receivable for the corresponding CPE modems 112 in the same binder 106, or at least for the modems 112 that support the low power mode (306). The "fast wake-up" group is preferably located at low frequencies. The bandwidth and the location of the "fast wake-up" group can be determined by the service provider. The bandwidth is preferably wide enough to provide sufficient bandwidth for a voice call with a robust modulation scheme such as QPSK. For example, a voice call transmitted with 128 kbps would require 16 QPSK modulated sub-carriers assuming a DMT symbol rate of 4 kHz (not including framing overhead). The "fast wake-up" group can be implemented by more than one continuous DMT frequency band, but can also be formed of multiple non-continuous frequency bands. According to embodiments, the "fast wake-up" group includes lower frequency sub-carriers. For the ADSL2/ADSL2+ and long reach VDSL2 standards, the upstream group is allocated up to 138 kHz/276 kHz and is commonly referred to as the "upstream band-0" or "extended upstream band-0." In embodiments, only sub-carriers of the upstream band-0 are used to support the "fast wake-up" group. The upstream band-0 has a limited number of carriers and corresponding sub-carriers. However, the upstream band-0 is located at very low frequencies. At such frequencies, crosstalk is not as strong as at higher frequencies. Therefore, the virtual noise protection given to the "fast wake-up" group by the power mode controller 114 can be limited and results in only a negligible data rate loss over the "fast wake-up" group.

The multi-tiered power management scheme can be implemented by the power mode controllers 114 in hardware, firmware or some combination of both. Those skilled in the art can implement various portions of the description, block diagrams and operational flows described herein in the form of computer-executable instructions, which may be embedded in one or more forms of computer-readable media. As used herein, computer-readable media may be any media that can store or embody information that is encoded in a form that can be accessed and understood by a computing device. Typical forms of computer-readable media include, without limitation, both volatile and nonvolatile memory, data storage devices, including removable and/or non-removable media, and communication media. Accordingly, existing CPE modems can implement multi-tiered power management scheme without requiring a redesign. For those modems not capable of implementing the multi-tiered power management scheme, these modems may protect themselves against fluctuating crosstalk by defining appropriate virtual noise levels, i.e. the "fast wake-up" group of sub-carriers is protected with a sufficient high noise margin. For additional power savings when operating in the "fast wake-up" group of sub-carriers, additional dedicated hardware can be provided to support this operational mode. The hardware may include only those circuits needed to support the multi-tiered power management scheme, thereby reducing hardware power consumption during low-power events. For full data rate transmission, additional hardware can be powered-up to accommodate higher bandwidth demand.

Figure 4:
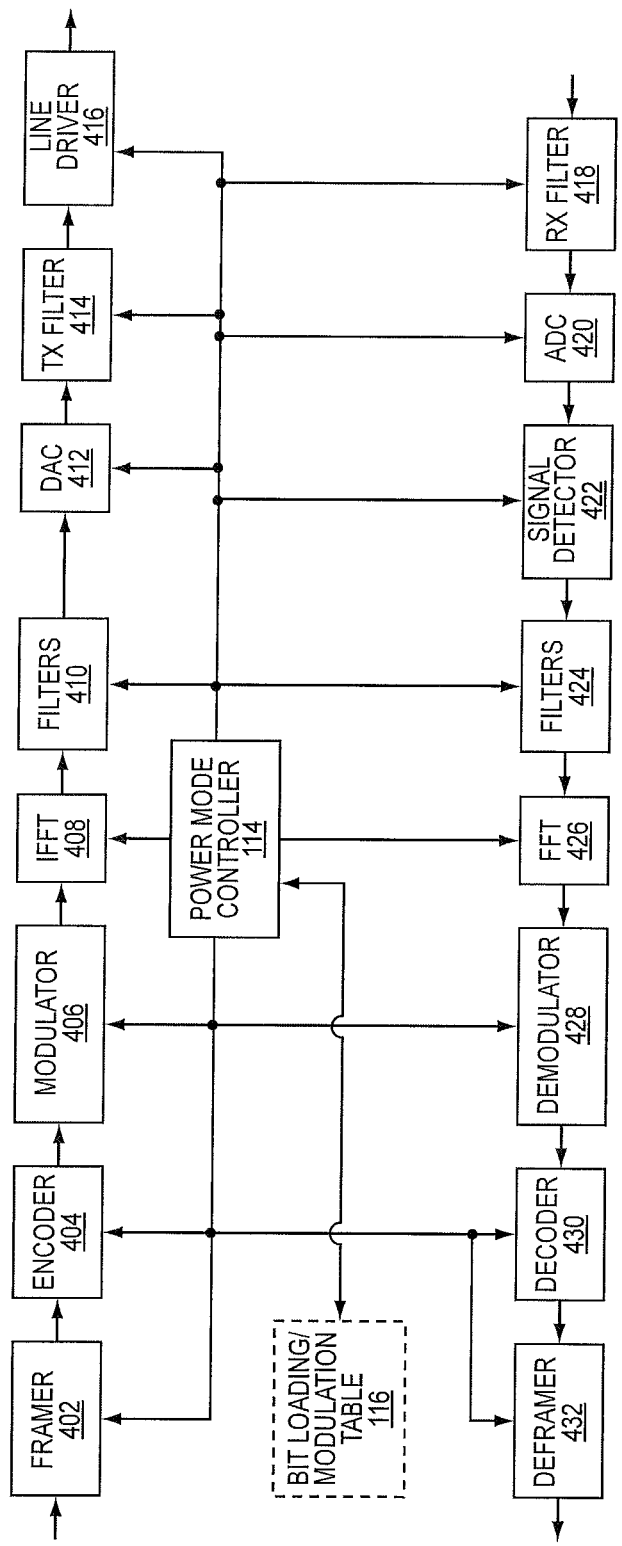
FIG. 4 illustrates a block diagram of an embodiment of transmit and receive circuitry of DSL equipment having a power mode controller.

FIG. 4 illustrates an embodiment of the front end portion of the CPE modem 112 and COE DSLAM 108, including the power mode controller 114. According to this embodiment, the front end includes transmit and receive circuitry. The transmit circuitry includes a framer 402 for multiplexing serial data into frames, generating FEC (forward error correction) and interleaving the data. An encoder 404 encodes the frames to produce constellation data. For low bandwidth transmissions over the "fast wake-up" group of sub-carriers, the encoder 404 assigns a number of bits per tone corresponding to the robust bit-loading/modulation scheme predetermined for the "fast wake-up" group as previously described herein. For higher bandwidth transmissions, the encoder 404 assigns the maximum number of bits per tone, e.g. based on measured SNR of each carrier and generates a QAM (quadrature amplitude modulation) constellation where each point represents a digital value. Each constellation point can be one of N complex numbers each having distinct phase and amplitude components.

The output of the encoder 404 is input to a DMT modulator 406 which groups N constellation points to a vector. The vector of N constellation points is input to an IFFT (inverse fast Fourier transform) module 408 which duplicates each carrier with its conjugate counterpart so the 2N output samples are real. The 2N time domain samples are extended by a cyclic extension consisting of cyclic prefix and optionally a cyclic suffix, and are then filtered 410 and input to a DAC 412 (digital-to-analog converter). The set of time domain samples represents a summation of all the modulated sub-carriers, for the duration of one data frame. The DAC 412 converts the digital transmit bit stream to analog form. The output of the DAC 412 is filtered by an analog filter 414 and amplified by a line driver 416. The line driver 416 interfaces to the line via a hybrid circuit (not shown).

On the receive side, downstream signals are filtered by a receive filter 418 and converted to digital form by an ADC 420 (analog-to-digital converter). A signal detector module 422 identifies a wake-up signal, e.g. based on a received signal strength measurement. The signal detector module 422 also enables "wake-up" of other necessary elements, including the power mode controller 114 if powered down in the low power mode (306). The signal detector module 422 can avoid false wake-ups caused by power received from crosstalk or other noise sources. The output of the signal detector 422 is filtered by digital filters 424. An FFT (fast Fourier transform) module 426 transforms the carriers back to phase and amplitude information, e.g. N complex QAM symbols which are then processed by a demodulator 428. The demodulator 428 outputs estimates of received symbols and can correct for attenuation of the signal amplitude and phase shifts. A decoder 430 converts the symbol estimates into frames which are then demultiplexed into a serial bit stream by a deframer 432.

The power mode controller 114 can power down any of the resources when not needed to accommodate the current bandwidth demand. In one embodiment, the power mode controller 114 resizes the IFFT and FFT modules 408, 426. In another embodiment, the power mode controller 114 changes the resolution of the DAC and ADC 412, 420. In yet another embodiment, the power mode controller 114 reduces the supply voltage applied to the line driver 416. The power mode controller 114 can also choose a different bitloading and/or modulation scheme that enables the low power mode (306), e.g. reduced-state bitloading and/or low bit rate modulation over a narrow band. The power mode controller 114 recognizes when the modem 112 should come out of low power mode and configures the appropriate changes. The power mode controller 112 can also reconfigure the modem 112 for transmitting and receiving a pilot tone for enabling clock synchronization. Alternatively, the modem 112 has a plurality of transmit and receive paths and the power mode controller 114 can switch between one or more transmitter paths used only for transmitting signals in the low power mode (306) and receiver paths used only for receiving signals in low power mode (306).

During operation, group information and virtual noise parameters for the upstream and/or downstream "fast wake-up" group of sub-carriers are communicated to the CPE modem 112. The modem 112 applies virtual noise to protect the "fast wake-up" group of sub-carriers as previously described herein. The modem 112 also performs the remainder of the standard DSL initialization (300). The modem 112 performs standard full data rate transmissions without modification (302). During a low-power event, the power mode controller 114 transitions the modem 112 to the low power mode (306). In one embodiment, the modem 112 uses the standard ADSL2 L2 mode to signal the COE 104 to move into the low power mode. According to one embodiment, only a pilot carrier is transmitted downstream if there is no payload data to be transmitted in the low power mode (306). Either a CPE 104 or the COE 102 decides to exit the low power mode (306), e.g. responsive to a signal received from the service provider or by monitoring transmit/receive buffer capacity. In response, a training signal is transmitted in the assigned "fast wake-up" group of sub-carriers. Upon detection of the signal, the other side also transmits a training signal in its assigned "fast wake-up" group of sub-carriers. After either a fixed duration or after transmission of some markers, e.g. SEGUE as defined in ADSL2 or SYNCHRO signals as defined in VDSL2, the modem 112 starts data transmission with a robust modulation scheme such as QPSK (308). Because a robust modulation is used in the first wake-up phase (308), a power back-off can be transmitted to reduce the effect of the crosstalk on the other lines in the same binder. The first wake-up phase (308) is sufficient for transmitting low bandwidth data such as a voice call.

Either the COE 102 or a CPE 104 signals the other side with control messages if additional bandwidth is needed or if the data rate of the first phase (308) is sufficient. If additional bandwidth is required, then a new bit-loading value and/or modulation scheme is applied to the sub-carriers in the "fast wake-up" group and the transmit power in the group is increased in the second wake-up phase (310). The new bit-loading value/modulation scheme can be selected from the stored tables 116 or based on a SNR measurement as previously described herein. The new bit-loading/modulation information is preferably exchanged during the first wake-up phase (308).

Preparing the modem 112 for moving back to the full data transmission phase (302) is done in the third wake-up phase (312). In this phase (312), the transmit power in the remaining groups(s) of sub-carriers is gradually increased. Robust training signals can be initially transmitted and only after the full transmit power is reached is full data transmission started. The transmit power increase could be done in several steps which can be predetermined or programmed by the service provider. In addition, there can be more defined wake-up phases and sub-carrier groups. This is advantageous for servicing multiple applications having different bandwidth demands such as voice, internet radio, HDTV, etc. Preferably, there is a dedicated wake-up phase and frequency sub-carrier group with a specific maximum bandwidth for each application class. The power mode controller 114 chooses the minimum wake-up phase that fulfills the bandwidth demand of the application class currently requested. After completion of the task, the CPE 104 and/or the COE 102 can return to the low power mode (306).

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method comprising:
setting a DSL transceiver in a low power mode in which no payload data is transmitted;
moving the DSL transceiver out of the low power mode responsive to the DSL transceiver receiving data;
wherein said moving the DSL transceiver out of the low power mode comprises:
in a first wake-up phase: transmitting payload data only on a first group of sub-carriers at a first transmit power, the first group of sub-carriers being a subset of the sub-carriers available to the DSL transceiver for transmission;

in a second wake-up phase: transmitting the payload data only on the first group of sub-carriers at a second transmit power, the second transmit power being larger than the first transmit power; and in a third wake-up phase: while transmitting training signals, gradually increasing a transmit power of sub-carriers not belonging to the first group of sub-carriers to reach a full transmit power and transmitting the payload data after the full transmit power has been reached.

2. The method of claim 1, comprising transmitting the payload data with a robust modulation on all sub-carriers of the first group of sub-carriers.

3. The method of claim 2, wherein the robust modulation is a QPSK modulation.

4. The method of claim 1, comprising transmitting the payload data on the first group of sub-carriers with a reduced transmit power spectrum density compared to a power spectrum density during a data transmission in a full power mode.

5. The method of claim 1, comprising:
initially transmitting training signals when moving the DSL transceiver out of the low power mode; and
thereafter, transmitting the payload data when moving the DSL transceiver out of the low power mode.

6. The method of claim 1, comprising:
performing a SNR measurement on the first group of sub-carriers; and
exchanging bitloading information between the DSL transceiver and a further DSL transceiver.

7. The method of claim 1, comprising moving the DSL transceiver back to the low power mode when no further payload data is to be transmitted.

8. The method of claim 1, comprising storing information indicating at least one property of the transmission during the moving out of the low power mode.

9. A method comprising:
setting a DSL transceiver in a low power mode in which no payload data is transmitted;
subsequently exiting the DSL transceiver from the low power mode;
wherein said exiting the DSL transceiver from the low power mode comprises:
in a first wake-up phase: transmitting payload data on a first group of sub-carriers at a first transmit power;
in a second wake-up phase: transmitting the payload data on the first group of sub-carriers at a second transmit power, the second transmit power being larger than the first transmit power; and
in a third wake-up phase: while transmitting training signals, gradually increasing a transmit power of sub-carriers not belonging to the first group of sub-carriers during the exit from the low power mode to reach a full transmit power and transmitting the payload data after the full transmit power has been reached.

10. The method of claim 9, comprising initially transmitting training signals on the sub-carriers not belonging to the first group of sub-carriers during the exit from the low power mode.

11. The method of claim 9, comprising:
measuring a SNR on the sub-carriers not belonging to the first group of sub-carriers;
determining a bitloading based on the SNR measurement; and
exchanging the bitloading information.

12. The method of claim 11, comprising transmitting the bitloading information on the sub-carriers of the first group of sub-carriers.

13. The method of claim 12, comprising transmitting in addition to the bitloading information other information on the sub-carriers of the first group of sub-carriers, the other information indicating at least one further property of the data transmission.

14. The method of claim 9, comprising increasing the transmit power on the sub-carriers not belonging to the first group only in one transmission direction during the exit from the low power mode.

15. A method of controlling power consumption by a first transceiver, comprising:
establishing a communication channel with a second transceiver over a plurality of sub-carriers using a modulation scheme agreed to by the transceivers;
deactivating at least some of the sub-carriers responsive to the first transceiver entering a low power state in which no payload data is transmitted;
reestablishing the communication channel over a subset of the sub-carriers using a predetermined modulation scheme generally immune to crosstalk responsive to the first transceiver exiting the low power state;
in a first wake-up phase during exiting from the low power state: transmitting payload data on the subset of sub-carriers at a first transmit power;
in a second wake-up phase during exiting the low power state: transmitting the payload data on the subset of sub-carriers at a second transmit power being larger than the first transmit power; and
in a third wake-up phase during exiting the low power state: reactivating the remainder of the sub-carriers when more communication bandwidth is required than can be provided by the subset of sub-carriers used to reestablish the communication channel, by gradually increasing a transmit power of the remainder of the sub-carriers to reach a full transmit power while transmitting training signals and transmitting the payload data after the full transmit power has been reached.

16. The method of claim 15, comprising selecting the subset of sub-carriers for reestablishing the communication channel so that the sub-carriers included in the subset provide a collective bandwidth of between 100 Kbps and 1 Mbps.

17. The method of claim 15, comprising exiting the low power state and reestablishing the communication channel over the subset of sub-carriers responsive to a new VoIP call initiated at the first or second transceiver.

18. The method of claim 17, comprising reactivating the remainder of the sub-carriers responsive to an application initiated at the first or second transceiver requiring more bandwidth than the VoIP call.

19. A method of controlling power consumption by a DSL transceiver, comprising:
setting the DSL transceiver in a low power mode in which no payload data is transmitted;
in a first wake-up phase: supporting low bandwidth payload data transmissions at the DSL transceiver using a first group of sub-carriers allocated to the DSL transceiver at a first transmit power while a second group of sub-carriers allocated to the DSL transceiver is powered-down;
in a second wake-up phase: supporting low bandwidth payload data transmission at the DSL transceiver using the first group of sub-carriers at a second transmit power while the second group of sub-carriers allocated to the DSL transceiver is powered-down, the second transmit power being larger than the first transmit power; and in a third wake-up phase: while transmitting training signals, gradually re-powering the second group of sub-carriers to reach a full transmit power so that higher bandwidth payload data transmissions are supported at the DSL transceiver using both the first and second groups of sub-carriers after the full transmit power has been reached.

20. The method of claim 19, comprising gradually re-powering the second group of sub-carriers so that modems communicating over other lines included in the same cable binder coupled to the DSL transceiver can adjust respective bit-loading schemes implemented at the modems for adapting to crosstalk caused by re-powering the second group of sub-carriers at the DSL transceiver.

\* \* \* \* \*